United States Patent [19]

Aizawa et al.

[11] 4,006,489

[45] Feb. 1, 1977

[54] FILM REWINDER MOUNTABLE ON CAMERA

[75] Inventors: Hiroshi Aizawa, Machida; Tomonori Iwashita, Chofu; Tadahide Fukushima, Tokyo; Yukio Iura, Yokosuka; Masanori Uchidoi, Kawasaki; Susumu Kozuki, Yokohama, all of Japan

[73] Assignee: Canon Kabushiki Kaisha, Tokyo, Japan

[22] Filed: May 22, 1975

[21] Appl. No.: 579,877

[30] Foreign Application Priority Data

May 29, 1974 Japan .................. 49-61558[U]

[52] U.S. Cl. ............................. 354/214; 354/173
[51] Int. Cl.² ................................... G03B 1/00
[58] Field of Search ........... 352/168, 169; 354/170, 354/171, 172, 173, 214, 295, 75

[56] References Cited

UNITED STATES PATENTS

| | | |
|---|---|---|
| 3,643,576 | 2/1972 | Daitoku et al. .................. 354/170 |
| 3,762,291 | 10/1973 | Kemura ........................ 354/173 X |
| 3,853,396 | 12/1974 | Ogiso et al. ................... 354/173 X |

FOREIGN PATENTS OR APPLICATIONS 1,072,881  1/1960  Germany .................. 354/173

*Primary Examiner*—Edna M. O'Connor
*Attorney, Agent, or Firm*—Toren, McGeady and Stanger

[57] ABSTRACT

A camera which permits mounting of an electric film rewinding device and which is provided with a compartment for inserting a film containing magazine. In the wall of the compartment, there is an opening which is provided with means for mounting and dismounting a manual film rewinding device in addition to electric rewinding device mounting means arranged at the same opening, so that the electric or manual film rewinding device can be interchangeably mounted on and detached from the camera.

5 Claims, 4 Drawing Figures

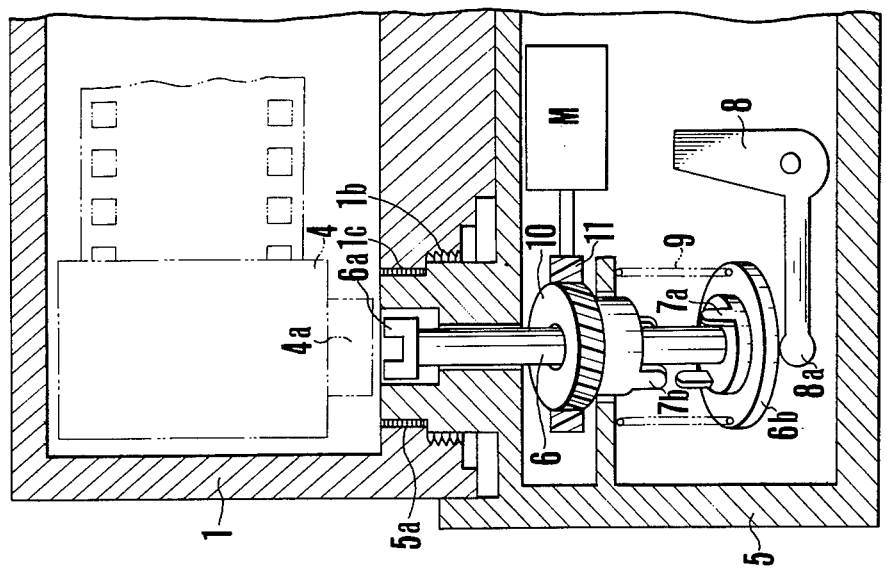
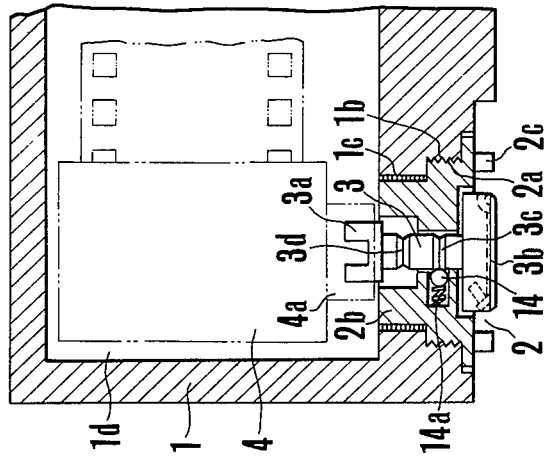

FILM REWINDER MOUNTABLE ON CAMERA

This invention relates to a film rewinding device for cameras and more particularly to a film rewinding device for system cameras.

The camera that are generally called "system cameras" are available with various attachments such as interchangeable lenses, finder parts, motor driving devices, etc. which are attachable to and detachable from the cameras for selective use to enable the camera users to photograph under an optimum camera condition. In accordance with this invention, this advantage of the system cameras is furthered by a novel arrangement that permits selective use of a manual or electric film rewinding device, which can be attached to and detached from the bottom of the camera.

There have been known some cameras which have manual rewinding devices disposed in their bottom parts. However, such rewinding arrangement in the conventional cameras has been designed merely for the purpose of solving the problem of structural spaces and not for the systemization of cameras.

In some of the conventionally known cameras, electric rewinding devices are incorporated in the camera bodies. Such arrangement, however, causes increase in the size and weight of the camera and thus causing inconvenience to the users who do not need electric rewinding devices. There have also been known some cameras that permit attaching and detaching of electric rewinding devices to and from their bottom. In the conventional cameras of such types, either a manual rewinding device provided on the upper part of the camera body is driven through interlocking means of an electric motor attached to the bottom of the camera body, or an electric rewinding device is arranged to be attachable in addition to a manual rewinding device provided on the camera body. The former arrangement makes the structure very complex. With the latter arrangement, there are such inconvenience and disadvantage that the manual rewinding device still must be retained there when electrical rewinding is required and that the electrical rewinding device mounting hole must be shielded from light when the electrical rewinding device is not used. Therefore, these conventional cameras are not suitable for use as system cameras.

It is the principle object of this invention to eliminate the shortcomings of the conventional cameras by providing means for mounting and dismounting a manual rewinding device interchangeably with an electric rewinding device in the same place.

The foregoing and other objects and features of this invention will become more apparent from the following description of an embodiment with reference to the accompanying drawings in which:

FIG. 2 is a sectional view showing a manual rewinding device.

FIG. 3 is a sectional view showing an electric rewinding device.

Figure 1:
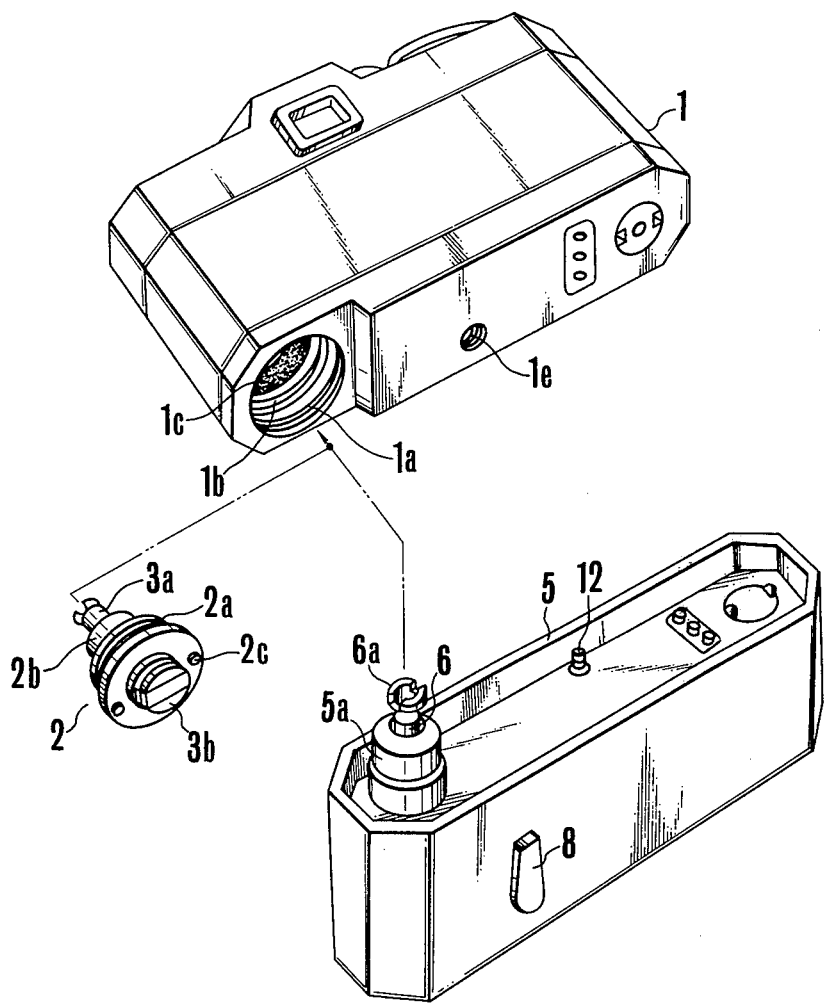
FIG. 1 is an oblique view showing the external structure of an embodiment of this invention.

Referring to the accompanying drawings, FIG. 1 through FIG. 3, a camera body 1 is provided with a film rewinding hole 1a which is arranged in the bottom of the camera body. The hole 1a is provided with an internal thread and is further provided with a light shielding member 1c which is located above the internal thread. On the outer circumference of a manual rewinding device 2, there is provided an external thread 2a with a cylindrical part 2b formed above the external thread in such a manner as to engage with the light shielding member 1c. In the middle part of the manual rewinding device 2, there is provided a manual rewinding shaft 3 with a rewind coupling part 3a secured to the upper end of the shaft 3. The rewind coupling part 3a is arranged to come to mate with a claw part which is disposed inside a protrudent end 4a of a film magazine 4 though it is not shown in the drawing. A rewinding crank 3b is secured to the lower end of the manual rewind shaft 3. The shaft 3 is provided with V-shaped grooves 3c and 3d which are located in two parts of the shaft. The reference numeral 14 indicates a clicking ball and 14a a clicking spring. The reference numeral 2c indicates a pin which is provided for mounting and demounting the manual rewinding device 2 on and from the camera body 1 and which is buried in the lower part of the manual rewinding device 2. An electric rewinding device 5 comprises a coupling part 5a which engages with the above stated light shielding member 1c; an electric rewinding shaft 6 disposed inside the electric rewinding device with a rewind coupling part 6a secured to the upper end of it to engage with the above stated claw part disposed inside a protrudent end 4a of the film magazine. At the lower end of the shaft, there are provided a claw clutch 7a and a disc 6b which engages with one end 8a of a rewind lever 8. Between the electric rewinding device body 5 and the disc 6b, there is provided a spring 9 which constantly urges the electric rewinding shaft 6 downward. The middle part of the electric rewinding shaft pierces through the center of a worm wheel 10 which is rotatably held by the electric rewinding device body 5. A claw clutch 7b is secured to the lower part of the worm wheel 10. The worm wheel 10 is linked to a worm 11 and a motor M. The reference numeral 12 indicates a screw provided for mounting the electric rewinding device on the camera body.

In carrying out a manual rewinding operation, the manual rewinding device is mounted on the lower part of the camera body by turning the whole assembly of the device by means of the pin 2c which is disposed thereon. By this, the external thread on the circumference of the manual rewinding device is mated with the internal thread 1b of the hole 1a provided in the lower part of the camera body to attach the manual rewinding device 2 to the lower part of the camera body as illustrated in FIG. 2. Then, the light shielding member 1c is brought into contact with the cylindrical part 2b to prevent the exterior light from entering into a magazine inserting compartment 1d. The clicking ball 14 is then made to engage with the first V-shaped groove 3c provided in the manual rewinding shaft 3 as shown in FIG. 2. Under this condition, the rewind coupling part 3a engages with the claws in the protrudent part 4a of a film magazine to permit manual cranking operation with the rewind crank. Then, the film can be rewound if the film is rotated in the rewinding direction. To remove or reinsert the film, the rewind crank is pulled down against the clicking spring 5 and the clicking ball 14 is brought into engagement with the second V-shaped groove 3d. This causes the rewind coupling part 3a to be released from the film magazine protrusion 3a so that the film can be taken out or reinserted. For removing the manual rewinding device 2 from the camera body 1, the thread parts are disengaged from each other by turning the device with a finger applied to the pin 2c. Next, for carrying out electrical rewinding, the mounted screw 12 is mated with a tripod thread 1e provided in the camera body to couple the electric rewinding device 5 to the lower part of the camera body. At this time, the coupling part 5a engages with the light shielding member 1c to prevent exterior light from entering the film magazine containing compartment 1d. To carry out film rewinding operation with the electric rewinding device 2, the motor M is rotated by means of a switch which is not illustrated in the drawing. Then the rewind lever 8 is turned against the spring 9 clockwise as viewed in FIG. 3. By this, the end 8a of the lever comes to push the electric rewinding shaft 6 upward through the disc 6b. The claw clutch parts 7a and 7b then engage with each other. The rewind coupling part 6a comes into the protrusion 4a of the film magazine to engage with the claw which is not illustrated but is provided inside the protrusion. In this manner, the driving force of the motor M is transmitted to a film feeding spool provided inside the film magazine through the worm 11, worm wheel 10, claw clutch parts 7a and 7b, electric rewinding shaft 6 and rewind coupling part 6a, so that the film can be rewound by this. Upon completion of the film rewinding operation, the rewind lever 8 is returned into the original position and, at the same time, the motor is switched off. This causes the spring 9 to push the electric rewinding shaft downward and the rewind coupling part 6a comes to disengage from the protrusion 4a of the magazine to permit the removal and/or insertion of the film. The switch for the motor may be interlinked with the rewind lever 8 to open and close as the lever is operated.

Figure 4:
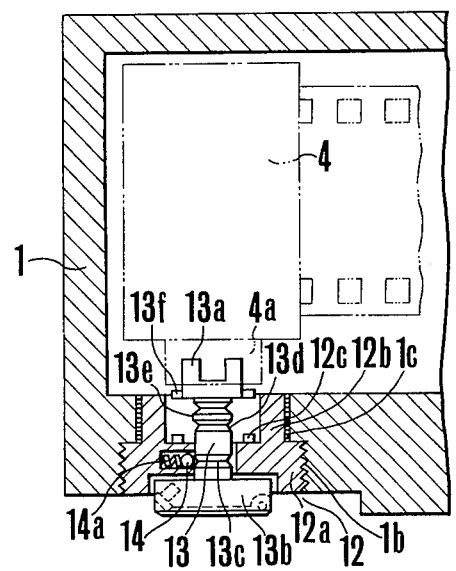
FIG. 4 is a sectional view showing a manual rewinding device of another embodiment of the invention.

What is illustrated in FIG. 4 is a modification example of the manual rewinding device shown in FIG. 2. In this example, the rewind crank can be used also for fitting and detaching the manual rewinding device. In FIG. 4, the parts corresponding to those in FIG. 2 are indicated by like reference numerals. An external thread 12a which mates with an internal thread 1b is provided on the outer circumference of the manual rewinding device 12. In the upper part of the device, there is formed a cylindrical part 12b which engages with the above stated light shielding member 1c. In the middle part of the manual rewinding device 12, there is disposed a manual rewinding shaft 13 with a rewind coupling part 13a provided at the upper end of the shaft. The rewind coupling part 13a is provided with a radial protrusion 13f. The manual rewinding shaft 13 is also provided with a rewind crank 13b at the lower end thereof. Three V-shaped grooves 13c, 13d and 13e which engage with a clicking ball 14 are provided in the middle part of the shaft 13. In a recess provided in the manual rewinding device 12, there is disposed a pin 12c. The operation of this manual rewinding device is as follows: For film rewinding, the clicking ball is caused to engage with the first V-shaped groove 13c (this is the condition illustrated in FIG. 4). Under this condition, the rewind coupling part 13a engages with the claw part provided inside the protrudent part of a film magazine, so that the film can be rewound when the rewinding crank is rotated by hand. For removing and inserting the film, the clicking ball is mated with the second V-shaped groove 13d. This causes the rewind coupling part 13a to detach from the protrudent part 4a of the film magazine, so that the film now can be removed or inserted. To insert or remove the manual rewinding device 12, the clicking ball is mated with the third V-shaped groove 13e. Under this condition, the protrusion 13f of the rewind coupling part engages with the pin 12c provided in the recess of the manual rewinding device. Then, the whole manual rewinding device 12 can be rotated by turning the rewinding crank 13b for removing or fitting the manual rewinding device 12. In this example of embodiment, the manual rewinding device is screwed on the camera body. However, this invention is not limited to such, but other means such as bayonet coupling arrangement may be adopted for mounting the manual rewinding device.

With the camera constructed in accordance with this invention as described in the foregoing, the camera body unit does not require any special additional members for the use of an electric rewinding device. Since the same space in the camera is used for mounting the manual and electric rewinding devices, the camera space is utilized very effectively. The manual rewinding device also serves as a light shielding lid. Therefore, this obviates the necessity of providing another light shielding lid when the electric rewinding device is not in use. Thus, in accordance with this invention, a camera system with such advantageous film rewinding arrangement can be obtained to enable the users to freely select a manual or electrical film rewinding operation as desired.

What is claimed is:

1. Camera apparatus comprising a housing having an exterior surface and an interior surface, said housing forming a compartment for a film magazine, said housing having a film winding hole therein extending from the exterior surface to the interior surface and opening into said compartment, means selectively connectable to said housing and insertable through said film rewinding hole into said compartment for rewinding the film in a film magazine, said means comprising a manual rewinding device and an electrically operated rewinding device, each of said manual rewinding device and electrically operated rewinding device comprising a rewinding shaft for selectively extending through said film rewinding hole and a rewind coupling part on the end of each said rewinding shaft capable of being located within said compartment and arranged to be releasably connected to the film magazine.

2. A camera, as set forth in claim 1, wherein said film rewinding hole has an internal thread and a light shielding member lining said hole inwardly of said internal thread, said manual rewinding device comprises a plug-like member having an external thread arranged to engage said internal thread on said film rewinding hole and a cylindrical part arranged to engage with said light shielding member, said rewinding shaft of said manual rewinding device extending through said plug-like member into said compartment upon connection to said housing.

3. A camera, as set forth in claim 1, wherein said electrically operated rewinding device comprises a casing attachable to said housing, a screw mounted in said casing and arranged to secure said casing to said housing at a location spaced laterally from said film rewinding hole.

4. A camera, as set forth in claim 3, wherein said film rewinding hole has an internal thread and a light shielding member lining said hole inwardly of said internal thread, said electrically operated winding device comprises a plug-like member, said rewinding shaft of said electrically operated rewinding device extending through said plug-like member, said plug-like member comprising a coupling part extending through said internal thread and disposed in engagement with said light shielding member upon connection to said housing.

5. A camera, as set forth in claim 4, wherein an electric motor is located within said casing, a worm located within said casing and connected to said motor for rotation thereby, a worm wheel located within said casing and mounted on said rewinding shaft of said electrically operated rewinding device, and clutch means for operatively engaging said rewinding shaft and said electric motor.

* * * * *